United States Patent Office 3,076,807
Patented Feb. 5, 1963

3,076,807
TRIAZINE DITHIOCARBAMATE PHOSPHATES
Llewellyn W. Fancher, Lafayette, Arthur M. Imel, Oakland, and Richard C. Maxwell, San Jose, Calif., assignors to Stauffer Chemical Company, a corporation of Delaware
No Drawing. Filed July 8, 1960, Ser. No. 41,491
6 Claims. (Cl. 260—248)

This invention relates to novel chemical compounds and the use of such compounds as insecticides and acaricides. The compounds have the following general formula:

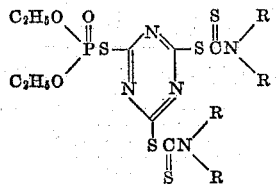

wherein R is lower alkyl or lower alkenyl. The compounds can be made from cyanuric chloride in accordance with the following general method:

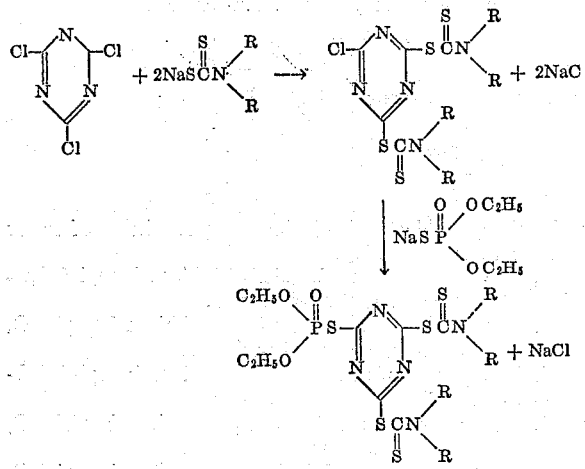

The following non-limiting examples illustrate a manner in which the compounds can be made. Code numbers have been assigned each compound and are used hereinafter for convenience.

EXAMPLE 1

2,4-Diethyldithiocarbamyl - 6 - O,O-Diethylmonothiophosphoryl-s-Triazine (R–3718)

Method 1.—16.4 g. (0.04 mole) of 2,4-(N,N-diethyldithiocarbamyl)-6-chloro-s-triazine and 11.5 g. (0.06 mole) of sodium O,O-diethylmonothiophosphate are added to 100 cc. of benzene. This mixture is stirred at the reflux temperature for five hours. After cooling, the reaction mixture is washed once with water (filtering if necessary to break emulsions), once with dilute sodium bicarbonate solution and twice again with water. After drying the solution over anhydrous magnesium sulfate and filtering, the benzene is removed by evaportion yielding 15.2 g. (70% of theory yellow oil $n_D^{30}$ 1.5802 (approx.).

Method 2.—To a solution of 16.4 g. (0.04 mole) of 2,4-(N,N-diethyldithiocarbamyl)-6-chloro-s-triazine in 150 cc. of methyl ethyl ketone is added 11.5 g. (0.06 mole) of sodium O,O-diethylmonothiophosphate in 100 cc. of methyl ethyl ketone. The mixture is brought to reflux and held there for about 20 hours, then the product isolated by removal of the methyl ethyl ketone by evaporation and taking up the residue in diethyl ether. The undissolved salt is removed by filtration and the filtrate, washed with 4–200 cc. portions of water, is dried with anhydrous magnesium sulfate. Filtration of the dried solution and removal of the other by evaporation yields 17 g. (78% of theory) oily product $n_D^{30}$ 1.5834.

Analysis.—Percent phosphorus: Estimated 5.7%. Found 6.1%.

EXAMPLE 2

2,4-Di-n-Propyldithiocarbamyl-6-O,O-Diethylmonothiophosphoryl-s-Triazine (R–4146)

By an analogous procedure as Example 1, Method 2, reacting 15.6 g. (0.04 mole) 2,4-(N,N-di-n-propyldithiocarbamyl)-6-chloro-s-triazine and 11.5 g. (0.06 mole) sodium O,O-diethylmonothiophosphate in 250 cc. of methyl ethyl ketone for 16 hours there was obtained 19.0 g. (80% of theory) orange oil $n_D^{30}$ 1.5735.

Analysis.—Percent Phosphorus: Estimated 5.2%. Found 5.5%.

EXAMPLE 3

2,4-Di-n-Amyldithiocarbamyl-6-O,O-Diethylmonothiophosphoryl-s-Triazine (R–4147)

By an analogous procedure as Example 1, Method 2, reacting 23.1 g. (0.04 mole) 2,4-(N,N-di-n-butyldithiocarbamyl)-6-chloro-s-triazine and 11.5 g. (0.06 mole) sodium O,O-diethylmonothiophosphate in 300 cc. of methyl ethyl ketone there was obtained 26.5 g. (97% of theory) of red oil $n_D^{30}$ 1.5562.

Analysis.—Percent phosphorus: Estimated: 4.4%. Found 4.4%.

EXAMPLE 4

2,4-Di-n-Heptyldithiocarbamyl - 6 - O,O - Diethylmonothiophosphoryl-s-Triazine (R–4148)

By an analogous procedure as Example 1, Method 2, reacting 27.5 g. (0.04 mole) 2,4-(N,N-di-n-heptyldithiocarbamyl-6,O,O-diethylmonothiophosphoryl - s - triazine and 11.5 g. (0.06 mole) of sodium O,O-diethylmonothiophosphate in methyl ethyl ketone for 16 hours there was obtained 26.7 g. (84% of theory of dark red oil $n_D^{30}$ 1.5418.

Analysis.—Percent phosphorus: Estimated 3.9%. Found 3.3%.

EXAMPLE 5

2,4-Di-n-Butyldithiocarbamyl - 6-O,O-Diethylmonothiophosphoryl-s-Triazine (R–4233)

By an analogous procedure as Example 1, Method 2, reacting 20.8 g. (0.04 mole) 2,4-(N,N-di-n-butyldithiocarbamyl)-6-chloro-s-triazine, 11.5 g. (0.06 mole) sodium O,O-diethylmonothiophosphate in 250 cc. methyl ethyl ketone for 16 hours there was obtained 17.2 g. (66% of theory) orange oil $n_D^{30}$ 1.5672.

EXAMPLE 6

2,4-Di-Allyldithiocarbamyl - 6 - O,O - Diethylmonothiophosphoryl-s-Triazine (R–4235)

By an analogous procedure as Example 1, Method 2, reacting 18.4 g. (0.04 mole) 2,4-(N,N-diallyldithiocarbamyl)-6-chloro-s-triazine, 11.5 g. (0.06 mole) sodium O,O-diethylmonothiophosphate in 250 cc. of methyl ethyl ketone for 16 hours was obtained 13.9 g. (60% of theory) dark red, very viscous oil $n_D^{30}$ 1.6185.

EXAMPLE 7

2,4-Di-n-Hexyldithiocarbamyl - 6-O,O-Diethylmonothiophosphoryl-s-Triazine (R–4323)

By an analogous procedure as Example 1, Method 2, reacting 25.4 g. (0.04 mole) 2,4-(N,N-di-n-hexyldithiocarbamyl)-6-chloro-s-triazine and 11.5 g. (0.06 mole) sodium O,O-diethylmonothiophosphate in 250 cc. methyl ethyl ketone there was obtained 19.5 g. (64% of theory) of orange oil $n_D^{30}$ 1.5267.

EXAMPLE 8

*2,4-Dimethyldithiocarbamyl - 6-O,O - Diethylmonothiophosphoryls-s-Triazine (R–4141)*

By an analogous procedure as Example 1, Method 2, 10.6 g. (0.03 mole) 2,4-(N,N-dimethyldithiocarbamyl)-6-chloro-s-triazine was reacted with 10.8 g. (0.035 mole) sodium O,O-diethylmonothiophosphate in 250 cc. of methyl ethyl ketone. There was obtained 12.0 g. (82% of theory) of a low melting yellow solid.

The compounds have been tested as insecticides and as acaricides according to the following methods:

*Acaricidal evaluation test.*—The two-spotted mite, *Tetranychus telarius* (Linn.) is employed in tests for acaricides. Young pinto bean plants are infested with several hundred mites. Dispersions of test compounds are prepared by dissolving half a gram of the toxic material in ten milliliters acetone. This solution is then diluted with water containing 0.015% Vatsol (a sulfonate-type wetting agent) and 0.005% Methocel (methyl cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD–50 value calculated using well-known procedures. LD–50 values are reported under the column "2 SM" in Table 1 and "2 SM–E" indicates the embryonic forms.

*Insecticidal evaluation tests.*—Four insect species are subjected to evaluation tests for insecticides:

(1) American cockroach (roach), *Periplaneta americana* (Linn.)
(2) Large milkweed bug (MWB), *Oncopeltus fasciatus* (Dallas)
(3) Confused flour beetle (CFB), *Tribolium confusum* (Duval)
(4) House fly (HF), *Musca domestica* (Linn.)

The procedure for the insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in Petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a Petri dish bottom, allowed to air dry and placed in a cardboard mailing tube. Twenty-five female flies are caged in the tube. The flies are continuously exposed to the known residue of the active compound in the cage. After twenty-four and seventy-two hours, counts are made to determine living and dead insects. The LD–50 values are calculated using well-known procedures.

The following LD–50 were obtained:

TABLE I

| Compound | HF | Roach | MWB | CFB | 2 SM | 2 SM–E |
|---|---|---|---|---|---|---|
| R–3718 | <50>10–20 µg | 0.06% | 0.03% | <100>10 µg | 0.06% | 0.25%. |
| R–4146 | 1,000 µg | 0 | >0.1% | >100<1,000 µg | 0 | 0. |
| R–4147 | 1,000 µg | 0.1% | 0.1% | 0.1% | 0 | 0. |
| R–4148 | 1,000 µg | >0.1% | 0.1% | 0 | 0.12% | 0. |
| R–4233 | 0.1% | 0 | >0.1% | 0 | 0 | 0. |
| R–4235 | 0.1% | 0 | 0 | 0 | >0.12% | 0. |
| R–4232 | 0.1% | 0 | 0 | 0 | >0.12% | 0. |
| R–4141 | 1,000 µg | 0.1% | 0.1% | >10<100 µg | 0.12% | 0. |

We claim:
1. A chemical compound of the formula

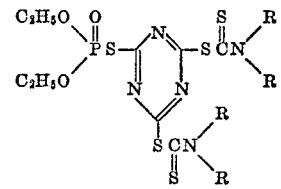

wherein R is selected from the group consisting of lower alkyl and lower alkenyl.

2. The compound: 2,4-diethyldithiocarbamyl-6-O,O-diethylmonothiophosphoryl-s-triazine.

3. The compound: 2,4-di-n-propyldithiocarbamyl-6-O,O-diethylmonothiophosphoryl-s-triazine.

4. The compound: 2,4-di-n-amyldithiocarbamyl-6-O,O-diethylmonothiophosphoryl-s-triazine.

5. The compound: 2,4-di-n-heptyldithiocarbamyl-6-O,O-diethylmonothiophosphoryl-s-triazine.

6. The compound: 2,4-di-n-butyldithiocarbamyl-6-O,O-diethylmonothiophosphoryl-s-triazine.

References Cited in the file of this patent

UNITED STATES PATENTS

| | | |
|---|---|---|
| 2,061,520 | Orthner et al. | Nov. 17, 1936 |
| 2,685,581 | Coover | Aug. 3, 1954 |
| 2,695,901 | D'Amico | Nov. 30, 1954 |
| 2,733,243 | D'Amico | Jan. 31, 1956 |
| 2,751,384 | Coover et al. | June 19, 1956 |
| 2,887,432 | Baker et al. | May 19, 1959 |

OTHER REFERENCES

Chemical Abstracts, volume 28, column 3620 (1934) (abstract of French Patent 760,281).

Chemical Abstracts, volume 28, column 5287 (1934) (abstract of German Patent 596,545).